(12) United States Patent
Morishima et al.

(10) Patent No.: US 7,490,185 B2
(45) Date of Patent: Feb. 10, 2009

(54) DATA PROCESSING SYSTEM, ACCESS CONTROL METHOD, AND ACCESS CONTROL DEVICE

(75) Inventors: Shinichi Morishima, Kanagawa (JP); Shingo Nakagawa, Kanagawa (JP); Masakazu Murata, Kanagawa (JP); Jun Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/299,597

(22) Filed: Dec. 12, 2005

(65) Prior Publication Data

US 2006/0129730 A1 Jun. 15, 2006

(30) Foreign Application Priority Data

Dec. 13, 2004 (JP) .......................... P2004-360261

(51) Int. Cl.
*G06F 13/16* (2006.01)
*G06F 12/00* (2006.01)
(52) U.S. Cl. ...................... 710/113; 711/114; 711/151
(58) Field of Classification Search ................. 711/114, 711/151; 710/113, 116, 241, 244
See application file for complete search history.

(56) References Cited

U.S. PATENT DOCUMENTS

| | | | |
|---|---|---|---|
| 5,854,887 A | 12/1998 | Kindell et al. | |
| 6,078,975 A | 6/2000 | Iwasaki | |
| 6,345,345 B1* | 2/2002 | Yu et al. | 711/151 |
| 6,510,489 B2* | 1/2003 | Komoto | 711/106 |
| 6,577,814 B1 | 6/2003 | Ito et al. | |
| 6,671,784 B2* | 12/2003 | Lee | 711/151 |
| 6,675,268 B1* | 1/2004 | DeKoning et al. | 711/151 |
| 6,721,789 B1* | 4/2004 | DeMoney | 709/219 |
| 6,839,817 B2* | 1/2005 | Hyde et al. | 711/154 |
| 7,130,947 B2* | 10/2006 | Barrick | 710/243 |
| 7,213,084 B2* | 5/2007 | Ogilvie et al. | 710/22 |
| 2003/0172237 A1* | 9/2003 | Watts | 711/151 |

FOREIGN PATENT DOCUMENTS

| | | |
|---|---|---|
| EP | 0 805 593 | 11/1997 |
| JP | 11 232205 | 8/1999 |
| JP | 2002 124019 | 4/2002 |
| JP | 2003 271545 | 9/2003 |

* cited by examiner

*Primary Examiner*—Glenn A Auve
(74) *Attorney, Agent, or Firm*—Frommer Lawrence & Haug LLP; William S. Frommer; Ellen Marcie Emas

(57) ABSTRACT

A data processing system able to raise the access efficiency to a memory when a plurality of processor access to the memory will be provided. An arbitration program executed by one input/output processing device determines a priority order for the access requests to the RAIDs so as to give the access permission with the highest priority to the access request linked with the reproduction port. The arbitration program notifies the result of the determination to the arbitrated programs executed by the other input/output processing devices.

18 Claims, 11 Drawing Sheets

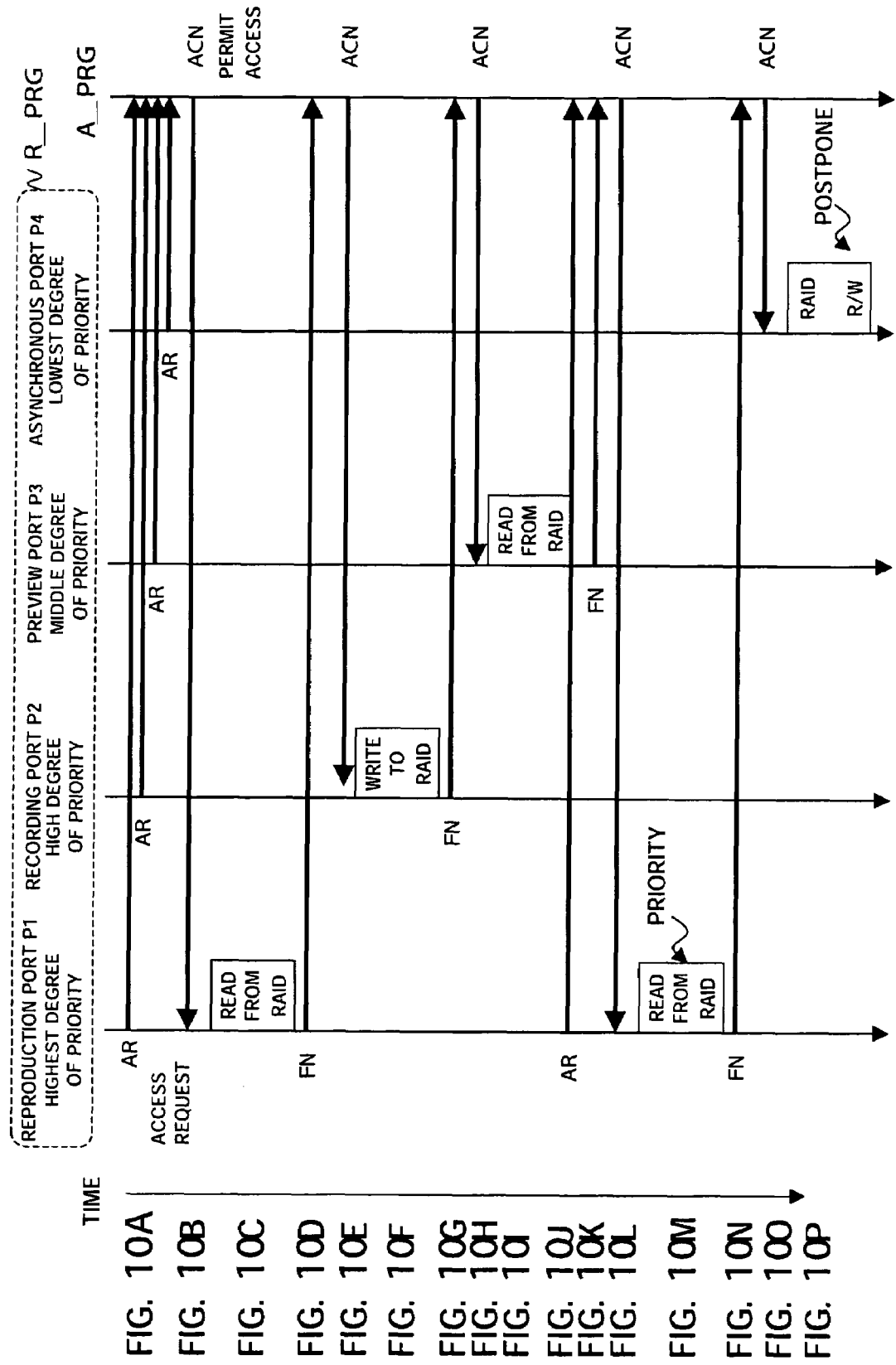

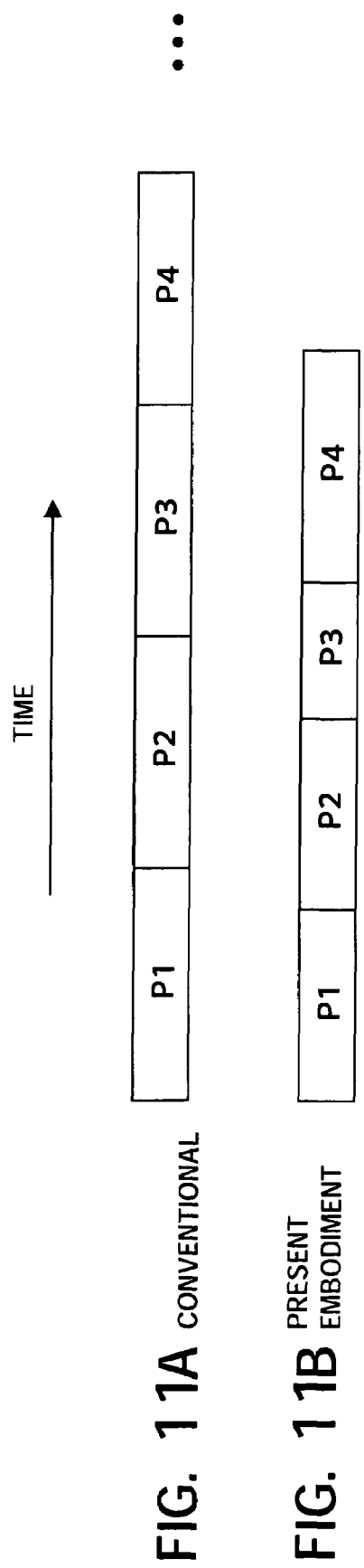

US 7,490,185 B2

DATA PROCESSING SYSTEM, ACCESS CONTROL METHOD, AND ACCESS CONTROL DEVICE

CROSS REFERENCES TO RELATED APPLICATIONS

The present invention contains subject matter related to Japanese Patent Application No. 2004-360261 filed in the Japan Patent Office on Dec. 13, 2004, the entire contents of which being incorporated herein by reference.

BACKGROUND OF THE INVENTION

1. Field of Invention

The present invention relates to a data processing system, an access control method, and an access control device for arbitrating competition when access requests from a plurality of processing means outputting data to a storage means compete.

2. Description of the Related Art

For example, there is a system where a plurality of processing apparatuses access a redundant array of inexpensive disks (RAID) or other storage device and transmit (broadcast) content data read out from the storage device at a predetermined output rate. The processing apparatuses for example access the storage device for various purposes other than the above transmission. Such a system employs a time slot system so as to reliably assign a fixed time during which access to the storage device is permitted at a predetermined period to each of a plurality of processing apparatuses or their ports. Due to this, each of the plurality of processing apparatuses or their ports accesses the storage device during time slots assigned to itself (see Japanese Patent Publication (A) No. 11-232205).

However, in a system employing the conventional time slot system explained above, since time slots are automatically assigned to the plurality of processing apparatuses or their ports even while not accessing the storage device and since access often ends without using all of the time slot period, there is the problem that access to the storage device is inefficient.

SUMMARY OF THE INVENTION

It is therefore desirable to provide a data processing system, an access control method, and an access control device able to raise the access efficiency to the storage means when a plurality of processing means access the storage means According to a first aspect of the invention, there is provided a data processing system comprising a storage means; a plurality of processing means for accessing the storage means via a data transmission line and outputting data read out from the storage means; and an arbitrating means for arbitrating access to the storage means by the plurality of processing means via the data transmission line in response to access requests from the plurality of processing means, wherein the arbitrating means determines a right-of-use order for imparting a right of use of the data transmission line to the plurality of access requests input from the plurality of processing means according to a priority order previously determined for the type of the access requests and sequentially imparts the right of use to the plurality of access requests according to the determined right-of-use order, and each processing means accesses the storage means via the data transmission line conditional on receiving the right of use from the arbitrating means.

According to a second aspect of the invention, there is provided an access control method for controlling access to a storage means by a plurality of processing means via a data transmission line, comprising a first step of having the plurality of processing means output access requests to the arbitrating means; a second step of having the arbitrating means determine a right-of-use order for imparting a right of use of the data transmission line to the plurality of access requests input in the first step according to the priority order previously determined for the type of the access request; a third step of sequentially imparting the right of use to the plurality of access requests according to the right-of-use order determined in the second step; and a fourth step of having a processing means access the storage mean via the data transmission line conditional on the processing means receiving the right of use for the access request output in the first step in the third step.

According to a third aspect of the invention, there is provided an access control device for controlling access to a storage means by a plurality of processing means via a data transmission line, comprising an interface for receiving as input access requests from the plurality of processing means; a determining means for determining a right-of-use order for imparting a right of use of the data transmission line to the plurality of access requests input from the interface according to a priority order previously determined with respect to the type of the access request; and a right-of-use imparting means for sequentially imparting the right of use to the plurality of access requests according to the right-of-use order determined by the determining means.

According to the present invention, a data processing system, an access control method, and an access control device able to raise the access efficiency to the storage means by determining a right-of-use order for imparting the right of use of the data transmission line to the storage means for access requests from a plurality of processing means when a plurality of processing means access the storage means can be provided.

BRIEF DESCRIPTION OF THE DRAWINGS

These and other objects and features of the present invention will become clearer from the following description of the preferred embodiments given with reference to the attached drawings, wherein:

FIG. 10A to FIG. 10P are views for explaining a fourth example of the operation of the content broadcasting and editing system of an embodiment of the present invention; and FIG. 11A and FIG. 11B are views for explaining effects of the embodiment of the present invention.

DESCRIPTION OF THE PREFERRED EMBODIMENTS

Below, a content broadcasting and editing system 1 according to an embodiment of the present invention will be explained.

Figure 1:
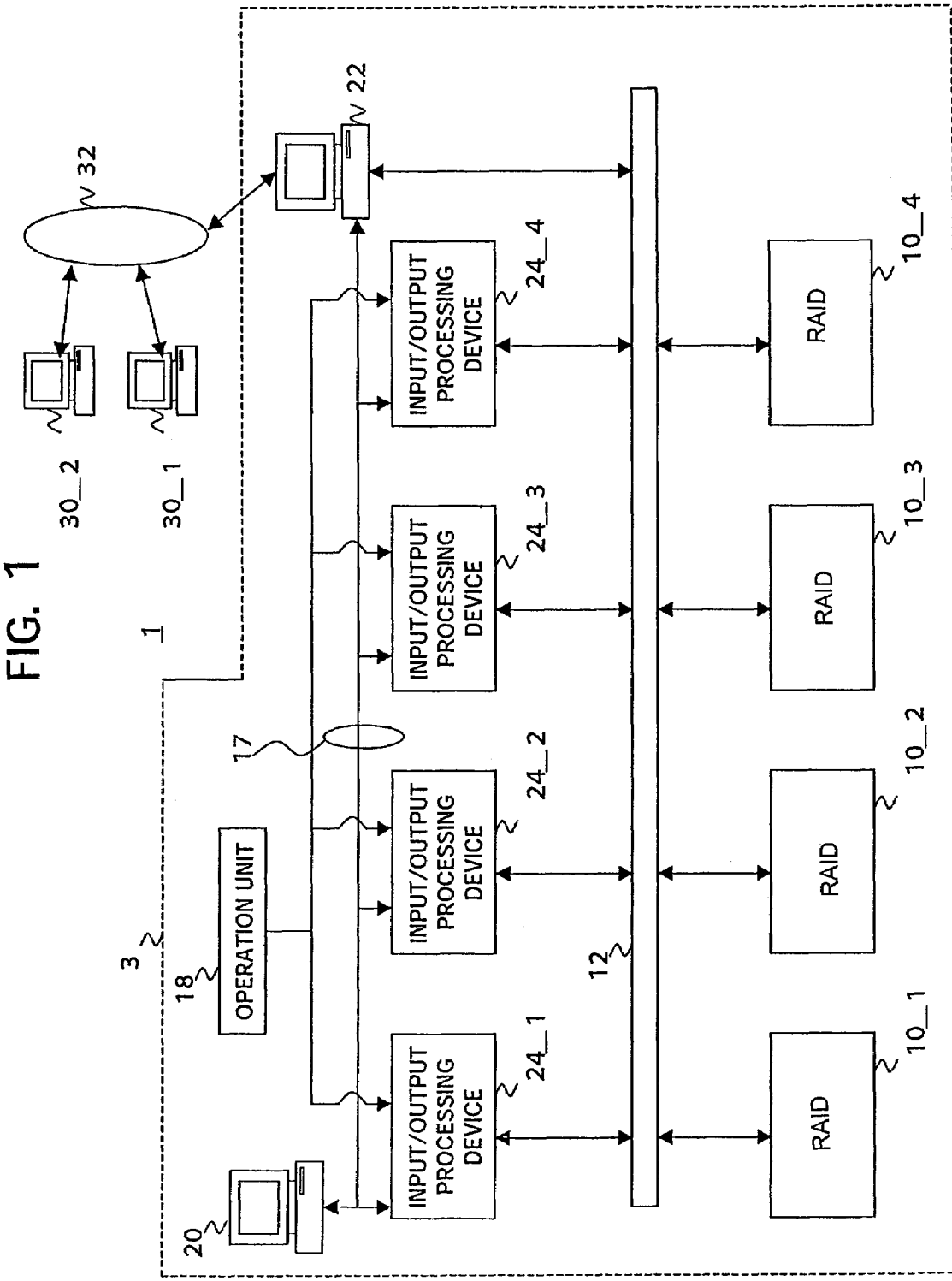
FIG. 1 is a view of the overall configuration of a content broadcasting and editing system according to an embodiment of the present invention.

FIG. 1 is a view of the overall configuration of a content broadcasting and editing system 1 according to an embodiment of the present invention. As shown in FIG. 1, the content broadcasting and editing system 1 has a broadcast system 3 and edit terminals 30_1 and 30_2. As shown in FIG. 1, the broadcast system 3 has for example RAIDs 10_1 to 10_4, a data bus 12, a control signal line 17, an operation unit 18, a management server 20, a relay server 22, and input/output processing devices 24_1 to 24_4.

[RAIDs 10_1 to 10_4]

The RAIDs 10_1 to 10_4 are connected to the data bus 12. The RAIDs 10_1 to 10_4 store the content data to be broadcast by the input/output processing devices 24_1 to 24_4. The RAIDs 10_1 to 10_4 store the individual content data dispersed in different RAIDs.

[Operation Unit 18]

The operation unit 18 is an operation button, a remote controller, a computer, etc. and outputs operation signals in response to operation of the user to the input/output processing devices 24_1 to 24_4.

[management Server 20]

The management server 20 holds memory addresses, file names, attribute data, etc. of the content data stored in the RAIDs 10_1 to 10_4 and outputs the management data to the input/output processing devices 24_1 to 24_4 and the relay server 22 via the control signal line 17 in response to the requests from them. The control signal line 17 is for example the Ethernet®.

[Relay Server 22]

The relay server 22 relays the input/output (transmission/reception) of the content data between a network 32 to which the edit terminals 30_1 and 30_2 are connected and the data bus 12. Further, the relay server 22 relays the input/output of control signals and the management data between the edit terminals 30_1 and 30_2 and the input/output processing devices 24_1 to 24_4 and the management server 20. The edit terminals 30_1 and 30_2 read out for example the content data from the RAIDs 10_1 to 10_4 via the relay server 22 and the data bus 12 and perform the editing by using this. Further, the edit terminals 30_1 and 30_2 write the content data generated by editing into the RAIDs 10_1 to 10_4. Access to the RAIDs 10_1 to 10_4 by the edit terminals 30_1 and 30_2 is realized by an asynchronous system not guaranteeing the data transfer rate.

[Input/Output Processing Devices 24_1 to 24_4]

Figure 2:
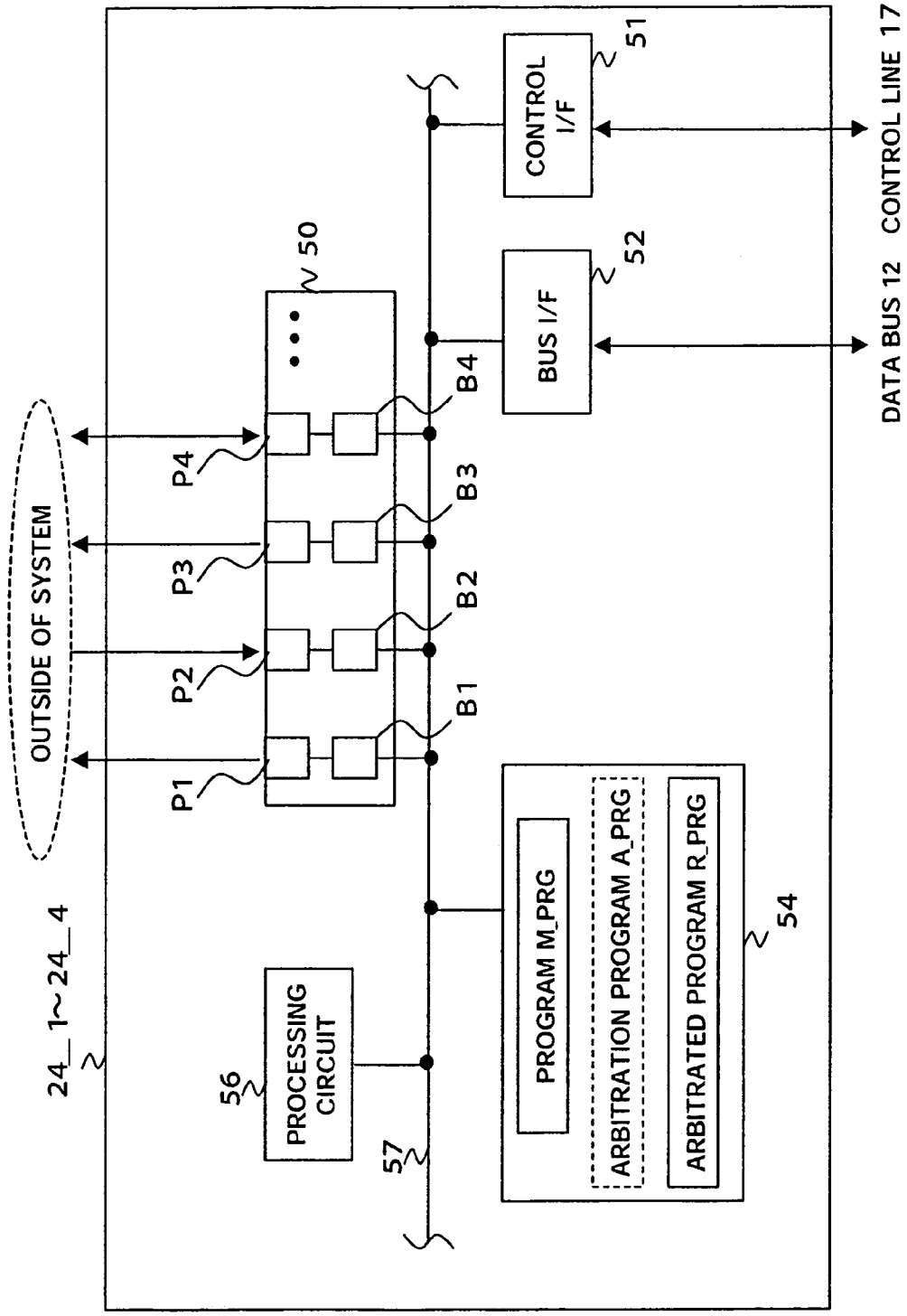
FIG. 2 is a view of the configuration of an input/output processing device shown in FIG. 1.

FIG. 2 is a view of the configuration of the input/output processing devices 24_1 to 24_4 shown in FIG. 1. As shown in FIG. 2, each of the input/output processing devices 24_1 to 24_4 has for example an input/output circuit 50, a control interface 51, a bus interface 52, a memory 54, and a processing circuit 56 connected via a data line 57.

The input/output circuit 50 has for example a reproduction port P1, a recording port P2, a preview port P3, an asynchronous port P4, a reproduction buffer memory B1, a recording buffer memory B2, a preview buffer memory B3, and an asynchronous buffer memory B4. Note that, in the example shown in FIG. 2, the case where four sets of ports and buffer memories were provided was exemplified, but any number may be provided.

The reproduction port P1 outputs the content data to be broadcast read out from the RAIDs 10_1 to 10_4 shown in FIG. 1 to the outside of the content broadcasting and editing system 1. The reproduction buffer memory B1 temporarily stores the content data to be broadcast described above which is read out from the RAIDs 10_1 to 10_4 and output to the reproduction port P1. In the present embodiment, the output of the content data to the outside via the reproduction port P1 is used for the purpose of for example a broadcast. It is required to guarantee the previously determined output rate. Namely, it is required that the amount of the data stored in the reproduction buffer memory B1 (amount of storage) becomes zero, that is, that underflow does not occur.

The recording port P2 receives as input for example the content data from the outside of the content broadcasting and editing system 1. The recording buffer memory B2 temporarily stores the content data input by the recording port P2 before writing the same into the RAIDs 10_1 to 10_4. In the present embodiment, it is required that the recording buffer memory B2 not overflow by the content data input from the outside and stored.

The preview port P3 outputs for example the content data to be previewed (broadcast) read out from the RAIDs 10_1 to 10_4 shown in FIG. 1 to the outside of the content broadcasting and editing system 1. The preview buffer memory B3 temporarily stores the content data to be previewed which is read out from the RAIDs 10_1 to 10_4 and output to the preview port P3. The asynchronous port P4 transfers the content data asynchronously with other computers etc. via an external not shown network of the content broadcasting and editing system 1. The asynchronous buffer memory B4 temporarily stores the content data transferred via the asynchronous port P4. Note that, in the present embodiment, the output rate is not guaranteed for the output of the content data via the preview port P3 and the asynchronous port P4.

Figure 3:
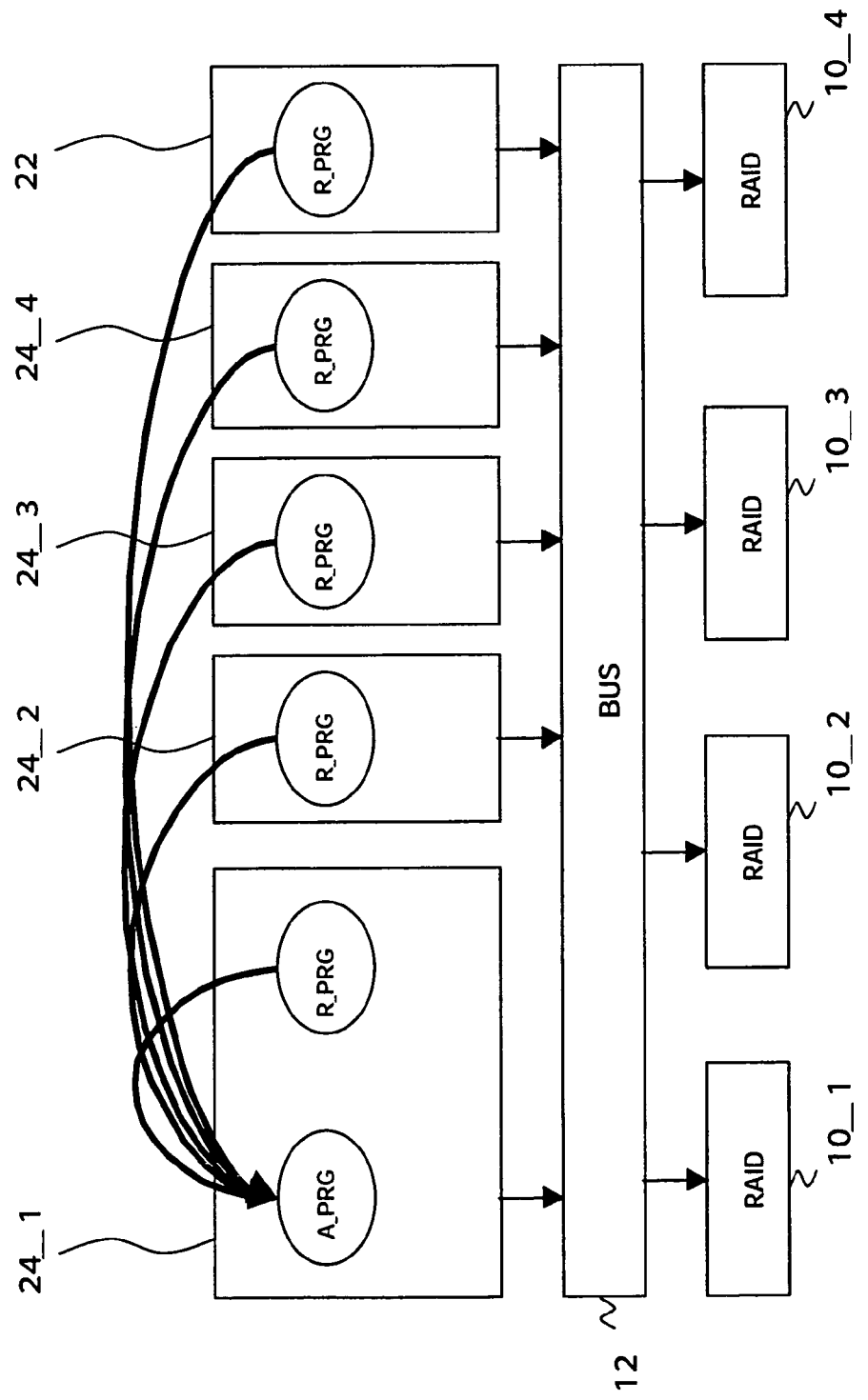
FIG. 3 is a view for explaining functions of an arbitration program A_PRG and arbitrated program R_PRG shown in FIG. 2.

The control interface 51 inputs/outputs control signals etc. with the other input/output processing devices 24_1 to 24_4, the management server 20, and the relay server 22 via the control signal line 17. The bus interface 52 inputs/outputs the content data with the RAIDs 10_1 to 10_4 via the data bus 12 shown in FIG. 1. The bus interface 52 can use any single one of the ports (input/output processing circuits 24_1 to 24_4) at each timing. Each memory 54 stores a program M_PRG, an arbitration program A_PRG (only input/output processing device 24_1), and an arbitrated program R_PRG. The memory 54 of each of the input/output processing devices 24_1 to 24_4 stores the program M_PRG for prescribing each fundamental function. Further, as shown in FIG. 3, the memory 54 of the input/output processing device 24_1 stores the arbitration program A_PRG and the arbitrated program R_PRG. Further, the memory 54 of each of the input/output processing devices 24_1 to 24_4 stores the arbitrated program R_PRG. Note that the relay server 22 also stores the arbitrated program R_PRG.

Figure 4:
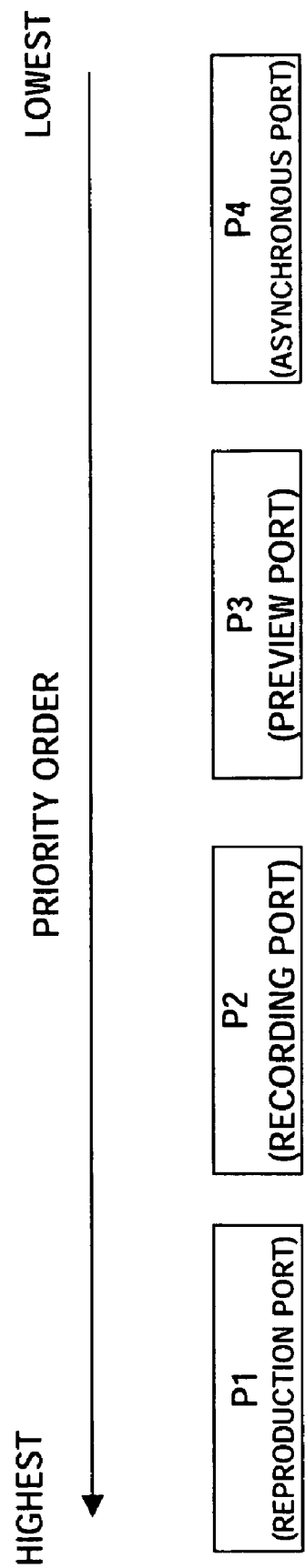
FIG. 4 is a view for explaining a priority order of access requests linked with ports shown in FIG. 2.

The arbitrated program R_PRG outputs an access request for requesting access to the RAIDs 10_1 to 10_4 to the arbitration program A_PRG of the input/output processing device 24_1. The arbitration program A_PRG arbitrates access requests input from the arbitrated programs R_PRG of the input/output processing devices 24_1 to 24_4 and gives access permission (right of use of the data bus 12) to the RAIDS 10_1 to 10_4. The arbitration program A_PRG prescribes the higher priority orders in the order of, for example as shown in FIG. 4, the reproduction port P1, the recording port P2, the preview port P3, and the asynchronous port P4, stores access requests linked with the input/output of the content data using these ports as a queue, and determines the access permission order according to the prescribed priority order. In the present embodiment, in this way, the access permission order is determined so as to give access permission with the highest priority to an access request linked with the reproduction port P1, therefore, even when not assigning time slots having fixed time lengths to the ports at the constant period as in the conventional system, it becomes possible to guarantee the output rate of the output of the content data to the outside via the reproduction port P1. Note that, the same priority order may be given to the reproduction port P1 and the recording port P2 as well. The processing of the input/output processing devices 24_1 to 24_4 based on the arbitrated program R_PRG and the arbitration program A_PRG will be explained in detail later.

Processing circuits 56 of the input/output processing devices 24_1 to 24_4 perform the predetermined processing (data input/output processing) of the circuits based on the programs M_PRG stored in the memories 54. Further, the processing circuits 56 of the input/output processing devices 24_1 to 24_4 control access to the RAIDs 10_1 to 10_4 along with the processing prescribed by the programs M_PRG based on the arbitrated programs R_PRG stored in the memories 54. Further, the processing circuit 56 of the input/output processing device 24_1 arbitrates access requests from the arbitrated programs R_PRG executed by the input/output processing devices 24_1 to 24_4 based on the arbitration program A_PRG stored in the memory 54.

Below, an example of the operation of the broadcast system 3 shown in FIG. 1 will be explained.

[First Example of Operation]

Figure 5:
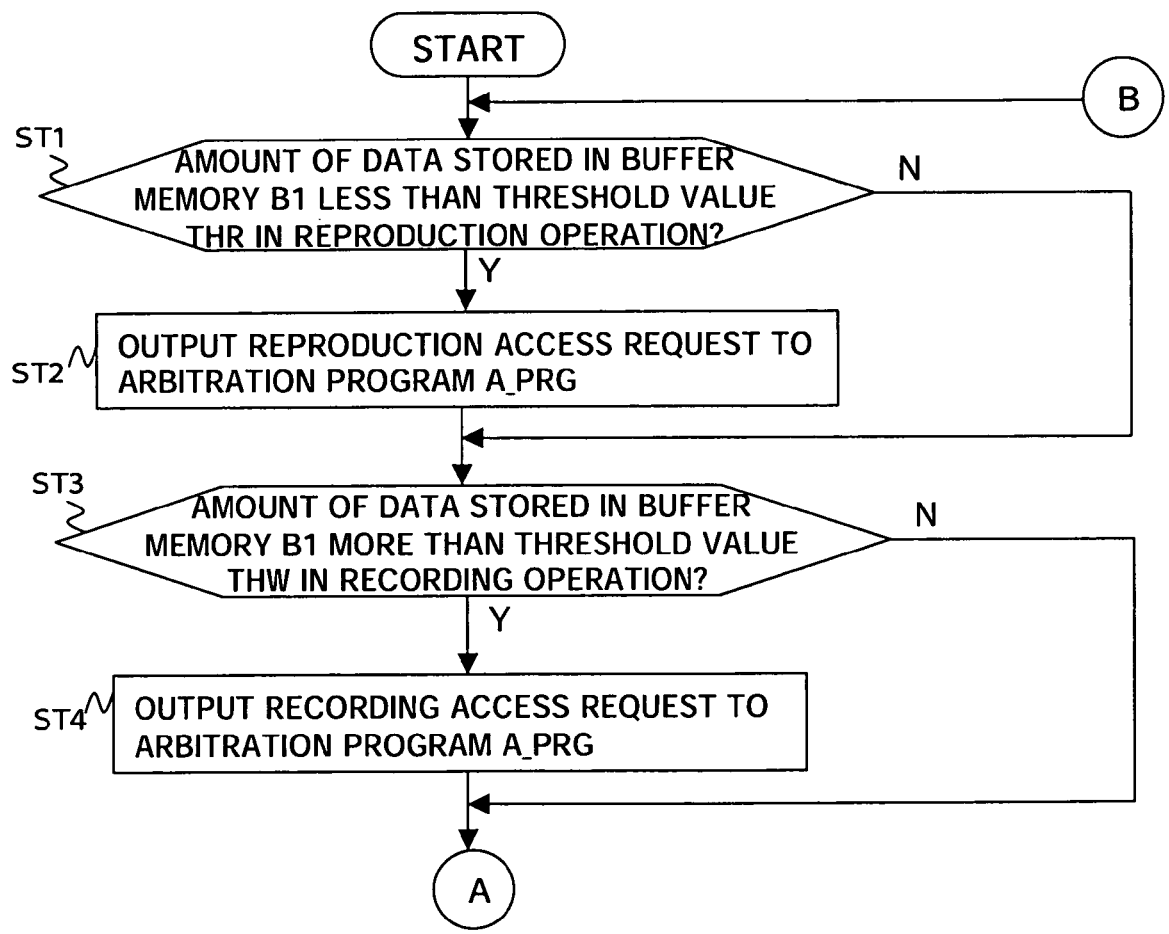
FIG. 5 is a flow chart for explaining an example of an operation of the arbitrated program R_PRG of the input/output processing device shown in FIG. 2 outputting an access request to the arbitration program A_PRG.
Figure 6:
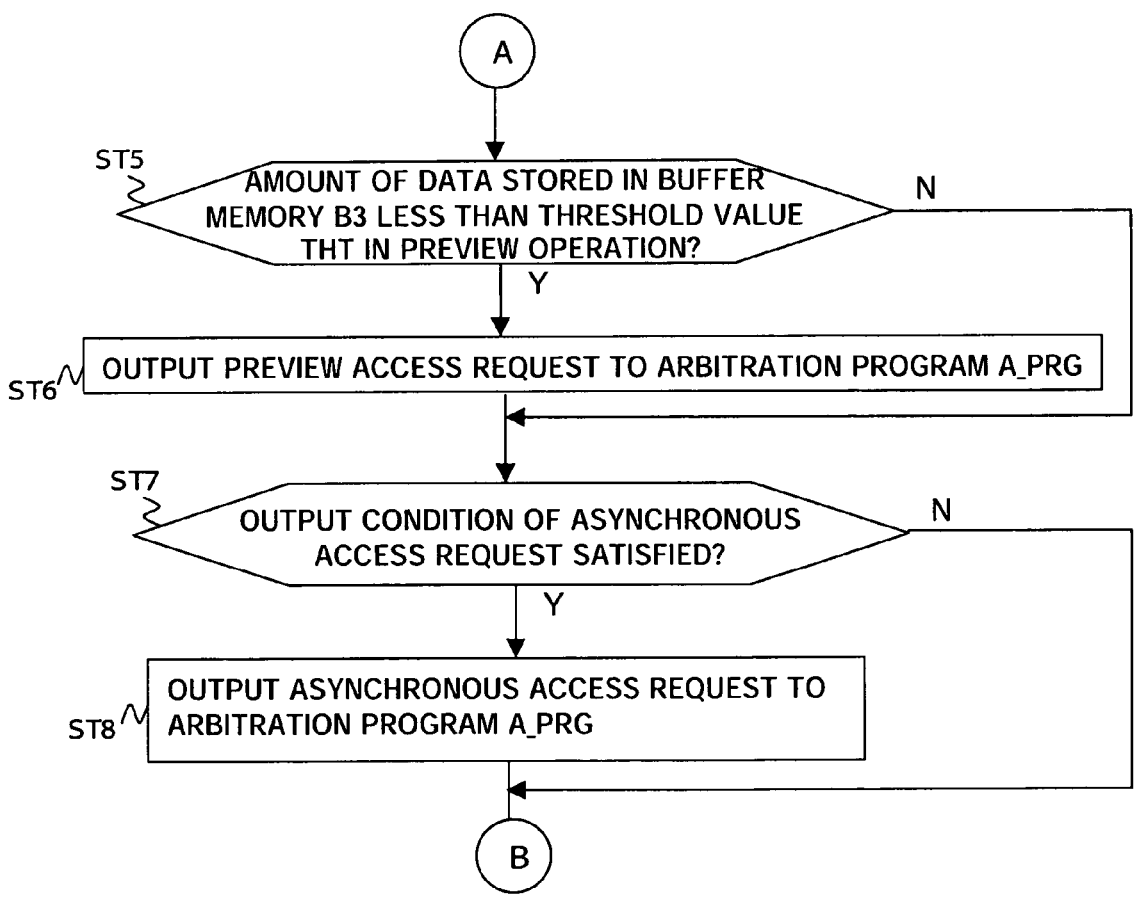
FIG. 6 is a flow chart continuing from FIG. 5 for explaining an example of an operation of the arbitrated program R_PRG of the input/output processing device shown in FIG. 2 outputting an access request to the arbitration program A_PRG.

Below, an example of the operation of the arbitrated programs R_PRG of the input/output processing devices 24_1 to 24_4 outputting access requests to the arbitration program A_PRG of the input/output processing device 14 will be explained. FIG. 5 and FIG. 6 are flow charts for explaining the example of operation. Below, an explanation will be given of steps of FIG. 5 and FIG. 6. The processing of FIG. 5 and FIG. 6 is executed by the processing circuits 56 of the input/output processing devices 24_1 to 24_4 according to the arbitrated programs R_PRG.

Step ST1:

The processing circuit 56 of each of the input/output processing devices 24_1 to 24_4 monitors the stored amount of the reproduction buffer memory B1. When it decides that the stored amount becomes a predetermined threshold value THR or less, the routine proceeds to step ST2, while when not deciding so, the routine proceeds to step ST3.

Step ST2:

The processing circuit 56 of the input/output processing device 24_1 outputs a reproduction access request to the arbitration program A_PRG executed by itself. Further, the processing circuit 56 of each of the input/output processing devices 24_1 to 24_4 outputs a reproduction access request to the arbitration program A_PRG executed by the input/output processing device 24_1 via the control signal line 17 shown in FIG. 1.

Step ST3:

The processing circuit 56 of each of the input/output processing devices 24_1 to 24_4 monitors the stored amount of the recording buffer memories B2. When it decides that the stored amount becomes a predetermined threshold value TH or more, the routine proceeds to step ST4, while when not deciding so, the routine proceeds to step ST5.

Step ST4:

The processing circuit 56 of the input/output processing device 24_1 outputs a recording access request to the arbitration program A_PRG executed by itself. Further, the processing circuit 56 of each of the input/output processing devices 24_1 to 24_4 outputs a recording access request to the arbitration program A_PRG executed by the input/output processing device 24_1 via the control signal line 17 shown in FIG. 1.

Step ST5:

The processing circuit 56 of each of the input/output processing devices 24_1 to 24_4 monitors the stored amount of the preview buffer memory B3. When it decides that the stored amount becomes a predetermined threshold value THR or less, the routine proceeds to step ST6, while when not deciding so, the routine proceeds to step ST7.

Step ST6:

The processing circuit 56 of the input/output processing device 24_1 outputs a preview access request to the arbitration program A_PRG executed by itself. Further, the processing circuit 56 of each of the input/output processing devices 24_1 to 24_4 outputs a preview access request to the arbitration program A_PRG executed by the input/output processing device 24_1 via the control signal line 17 shown in FIG. 1.

Step ST7:

When the processing circuit 56 of any of the input/output processing devices 24_1 to 24_4 decides that the stored amount etc. of for example the asynchronous buffer memory B4 satisfies predetermined conditions, the routine proceeds to step ST8, while when not deciding so, the routine returns to step ST1.

Step ST8:

The processing circuit 56 of the input/output processing device 24_1 outputs an asynchronous access request to the arbitration program A_PRG executed by itself. Further, the processing circuit 56 of each of the input/output processing devices 24_1 to 24_4 outputs an asynchronous access request to the arbitration program A_PRG executed by the input/output processing device 24_1 via the control signal line 17 shown in FIG. 1.

[Second Example of Operation]

Figure 7:
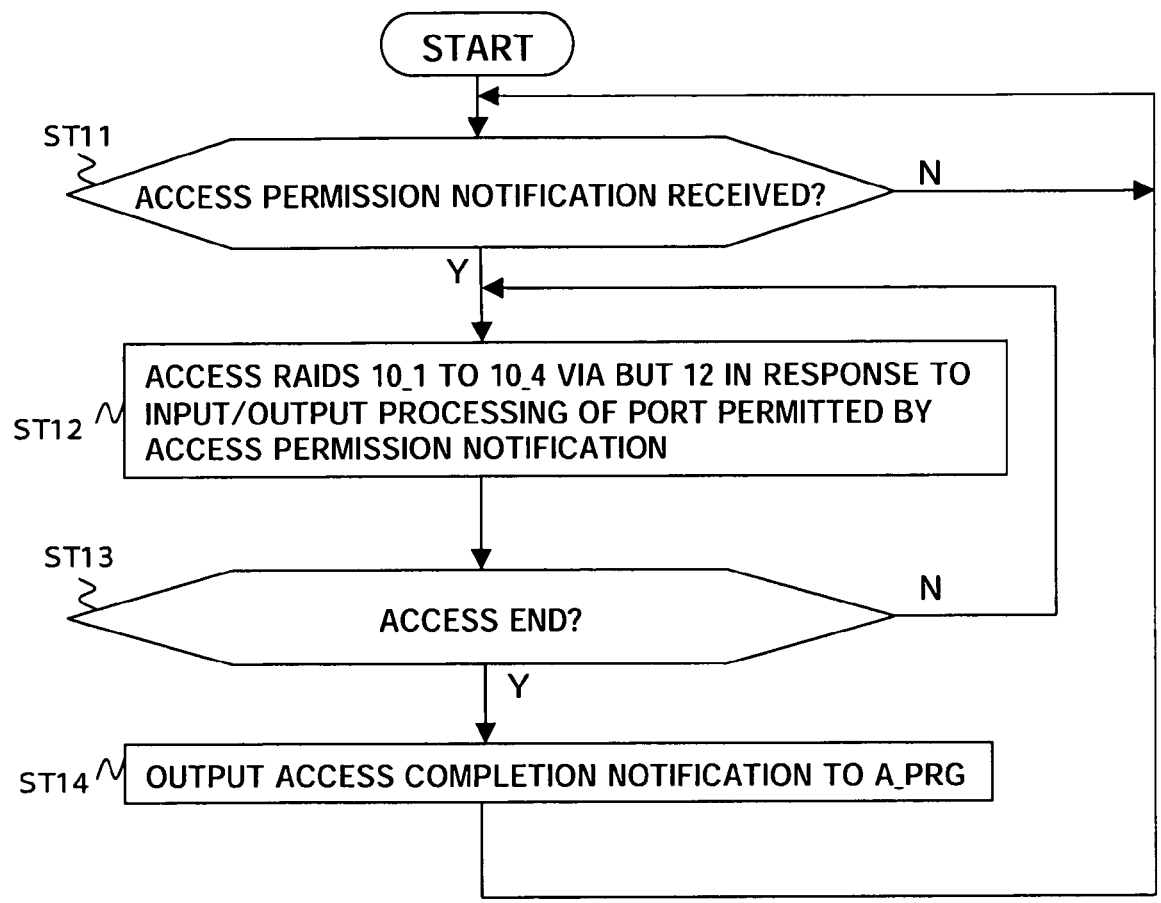
FIG. 7 is a flow chart for explaining an example of an operation of actually accessing RAID after outputting an access request in a first example of operation by the input/output processing device.

Below, an example of the operation of the input/output processing devices 24_1 to 24_4 actually accessing the RAIDS 10_1 to 10_4 after outputting the access requests in the first example of operation explained above will be explained. FIG. 7 is a flow chart for explaining the example of operation. Below, an explanation will be given of the steps of FIG. 7. The processing of FIG. 7 is executed according to the arbitrated programs R_PRG by the processing circuits 56 of the input/output processing devices 24_1 to 24_4.

Step ST11:

When the processing circuit 56 of any of the input/output processing devices 24_1 to 24_4 receives as input an access permission notification from the arbitration programs A_PRG executed by itself or conditional on it receiving as input an access permission notification from the input/output processing device 24_1 via the control interface 51 and the control signal line 17, the routine proceeds to step ST12. The access permission notification includes for example information indicating which type of access request among the above reproduction access request, recording access request, preview access request, and asynchronous access request it corresponds to.

Step ST12:

The processing circuit 56 of each of the input/output processing devices 24_1 to 24_4 accesses the RAIDs 10_1 to 10_4 by processing corresponding to the type of the access request in the processing performed based on the program M_PRG according to the type of access request indicated by the access permission notification input in step ST11. Namely, the processing circuit 56 acquires the right of use of the data bus 12 shown in FIG. 1 and accesses the RAIDs 10_1 to 10_4 via the data bus 12.

Step ST13:

The processing circuit 56 of each of the input/output processing devices 24_1 to 24_4 decides whether or not the access of step ST12 ends. When it decides it ends, the routine proceeds to step ST14, while when not, the access processing of step SR12 is continued. Note that the maximum time by which a processing circuit 56 can access the RAIDs 10_1 to 10_4 by one access permission notification is set in advance in terms of the system so that all of the input/output processing devices 24_1 to 24_4 can guarantee the predetermined output rate in the broadcast of the content data.

Step ST14:

The processing circuit 56 of each of the input/output processing devices 24_1 to 24_4 outputs an access completion notification to the arbitration program A_PRG executed by the input/output processing device 24_1.

[Third Example of Operation]

Figure 8:
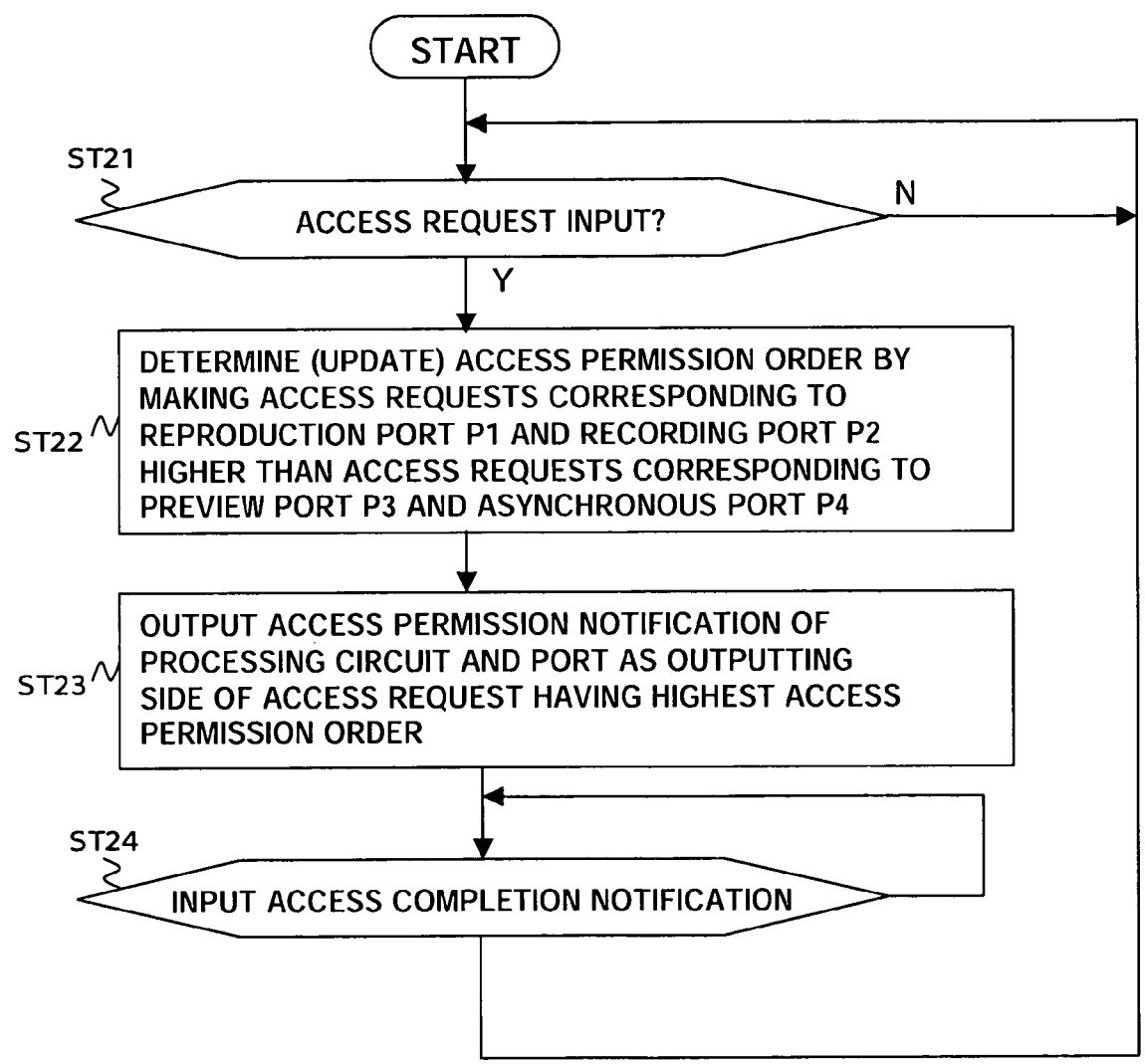
FIG. 8 is a flow chart for explaining an example of the operation in a case where an input/output processing device receives as input an access request in the first example of operation.

Below, an example of the operation where the input/output processing device 24_1 receives as input the access request in the above first example of operation will be explained. FIG. 8 is a flow chart for explaining the example of operation. Below, an explanation will be given of steps of FIG. 8. The processing of FIG. 8 is executed by the processing circuit 56 of the input/output processing device 24_1 according to the arbitration program A_PRG.

Step ST21:

The processing circuit 56 of the input/output processing device 24_1 decides whether or not it receives as input access requests explained above from the arbitrated programs R_PRG executed by the processing circuits 56 of the input/output processing devices 24_1 to 24_4. It proceeds to step ST22 when it receives as input the access requests.

Step ST22:

The processing circuit 56 of the input/output processing device 24_1 sets higher priority orders in the order of access requests linked with the reproduction port P1, the recording port P2, the preview port P3, and the asynchronous port P4 as explained by using FIG. 4. The processing circuit 56 determines the access permission order of unprocessed access requests among input access requests based on the port information and the priority order to which the access requests are linked. Note that when a new access request is input in step ST21, the processing circuit 56 updates the access permission order so as to include the access request. In the present embodiment, in this way, the access permission order is set so as to give the access permission with the highest priority to the access request linked with the reproduction port P1. Therefore, even when not assigning time slots having fixed time lengths to the port by a constant period as in the conventional system, it becomes possible to guarantee the output rate of the output of the content data to the outside via the reproduction port P1.

Step ST23:

The processing circuit 56 of the input/output processing device 24_1 identifies the access request having the highest priority order in the access permission order determined in step ST22 and outputs an access permission notification designating the type of the port to the arbitrated program R_PRG executed by the input/output processing device among the devices 24_1 to 24_4 outputting the identified access request.

Step ST24:

The processing circuit 56 of the input/output processing device 24_1 decides whether or not any access completion notifications are input from the arbitrated programs R_PRG executed by the input/output processing devices 24_1 to 24_4. When deciding that access completion notifications are input, the routine returns to step ST21. At this time, the processing circuit 56 erases the access requests corresponding to the access completion notifications from a list in the access permission order.

In the present embodiment, as explained above, an arbitrated program R_PRG executed by a processing circuit 56 accesses the RAIDs 10_1 to 10_4 in response to the input access permission notification. When the access is completed, it outputs an access completion notification to the arbitration program A_PRG. Then, when the arbitration program A_PRG executed by the processing circuit 56 receives the access completion notification, the access right to the RAIDs 10_1 to 10_4 is given to the access request having the next highest order in the access permission order. For this reason, when the access times to the RAIDs 10_1 to 10_4 accompanying one access request are different, in comparison with the technique of using time slots prescribed in a fixed manner matching with the longest access time as in the conventional system, the access start timing to the RAIDs 10_1 to 10_4 along with each access request can be made earlier, so the access to the RAIDs 10_1 to 10_4 can be efficiently carried out. Due to this, the performance of the broadcast system 3 can be improved.

[Fourth Example of Operation]

Figure 9:
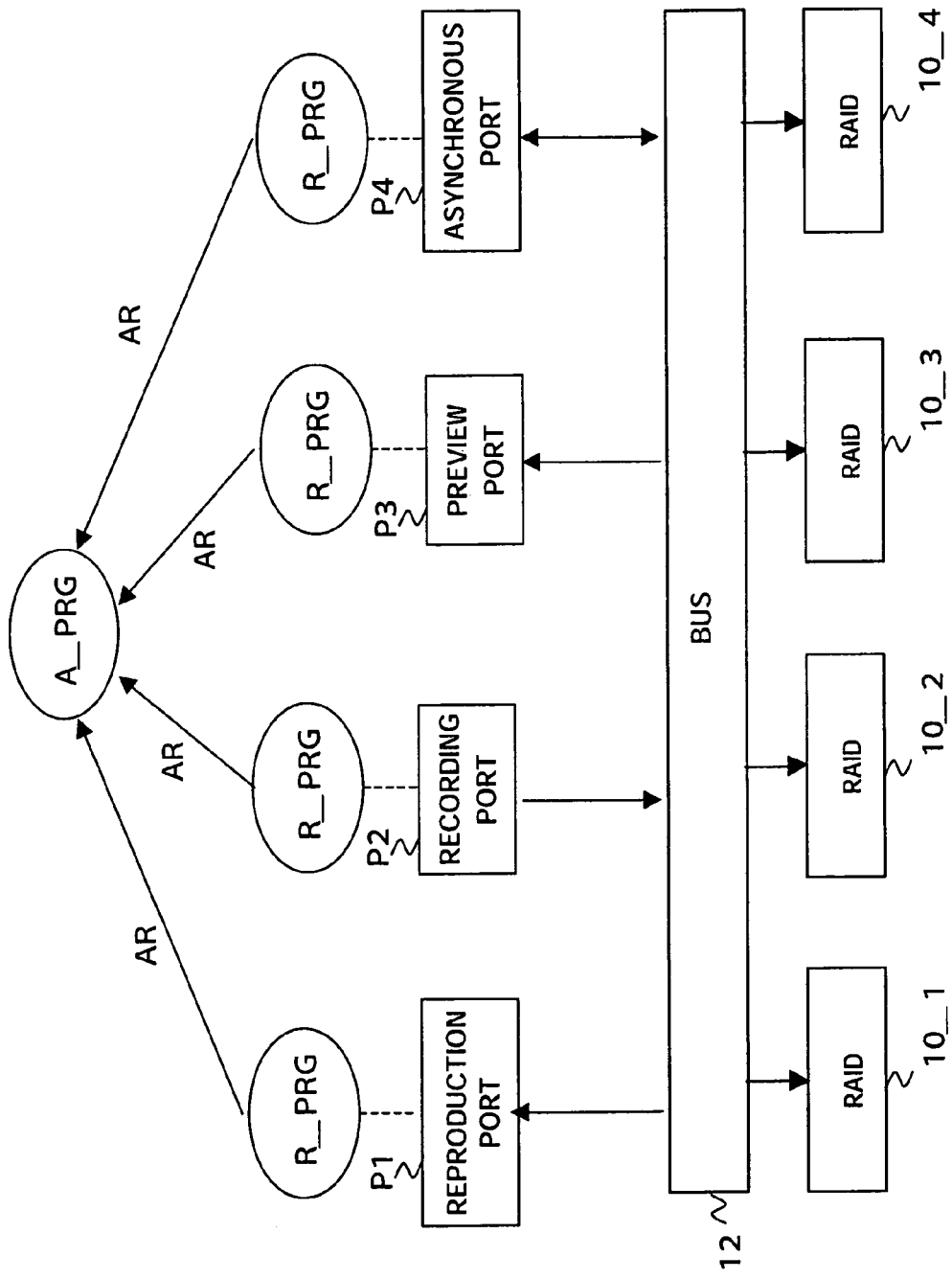
FIG. 9 is a view for explaining a fourth example of the operation of the content broadcasting and editing system of the present embodiment.

Below, an example of the operation in a case where access requests AR indicating types of ports are input by the arbitration program A_PRG executed by the processing circuit 56 of the input/output processing device 24_1 as shown in FIG. 9 and FIG. 10A when the content data is input/output by using any of the four ports of the reproduction port P1, recording port P2, preview port P3, and asynchronous port P4 provided in each of the input/output processing devices 24_1 to 24_4 will be explained. The arbitration program A_PRG executed by the processing circuit 56 of the input/output processing device 24_1 executes the processing of step ST12 shown in FIG. 8 when the above four access requests AR are input from the arbitrated programs R_PRG in FIG. 10A and determines the access permission order giving higher (earlier) orders in the order of the access requests linked with the reproduction port P1, the recording port P2, the preview port P3, and the asynchronous port P4.

Next, in FIG. 10B, the arbitration program A_PRG executed by the input/output processing device 24_1 outputs an access permission notification ACN to the arbitrated program R_PRG of the input/output processing device among the devices 24_1 to 24_4 transmitting an access request AR linked with the reproduction port P1 having the highest order based on the above determined access permission order in response to the access request AR. Next, in FIG. 10C, the arbitrated program R_PRG receiving as input the access permission notification ACN in FIG. 10B accesses the RAIDs 10_1 to 10_4 via the data bus 12 to read out the content data, stores this in the reproduction buffer memory B1 shown in FIG. 2, guarantees the predetermined output rate from the reproduction port P1, and outputs it for the broadcast etc. Next, in FIG. 10D, when the above access to the RAIDs 10_1 to 10_4 is completed, the arbitrated program R_PRG outputs an access completion notification FN to the arbitration program A_PRG. Then, the arbitration program A_PRG of the input/output processing device 24_1 deletes the access request AR corresponding to the reproduction port P1 from the list of the access permission order.

Next, in FIG. 10E, the arbitration program A_PRG executed by the input/output processing device 24_1 outputs an access permission notification ACN to the arbitrated program R_PRG of the input/output processing device among the devices 24_1 to 24_4 transmitting the access request AR linked with the recording port P2 having the next highest order based on the above determined access permission order in response to the access request AR. Next, in FIG. 10F, the arbitrated program R_PRG receiving as input the access permission notification ACN in FIG. 10E reads out the content data from the recording buffer memory B2, accesses the RAIDs 10_1 to 10_4 via the data bus 12, and writes the read out content data into the RAIDs 10_1 to 10_4. Next, in FIG. 10G, the arbitrated program R_PRG outputs an access completion notification FN to the arbitration program A_PRG when completing the above access to the RAIDs 10_1 to 10_4. Then, the arbitration program A_PRG of the input/output processing device 24_1 deletes the access request AR corresponding to the recording port P2 from the list of access permission order.

Next, in FIG. 10H, the arbitration program A_PRG executed by the input/output processing device 24_1 outputs an access permission notification ACN to the arbitrated program R_PRG of the input/output processing device among the devices 24_1 to 24_4 transmitting the access request AR linked with the preview port P3 having the next highest order based on the above determined access permission order in response to the access request AR. Next, in FIG. 10I, the arbitrated program R_PRG receiving as input the access permission notification ACN in FIG. 10H accesses the RAIDs 10_1 to 10_4 via the data bus 12 to read out the content data, stores this in the preview buffer memory B3 shown in FIG. 2, and outputs the same from the preview port P3 for the preview etc.

Assume that before the completion of the access, as shown in FIG. 10J, an access request AR indicating the reproduction port P1 is output from one of the input/output processing devices 24_1 to 24_4 to the arbitration program A_PRG. In this case, the arbitration program A_PRG executed by the input/output processing device 24_1 updates the access permission order so as to impart the highest order to the access request AR linked with the reproduction port P1. Thereafter, when the access shown in FIG. 10I is completed, in FIG. 10K, the arbitrated program R_PRG outputs an access completion notification FN to the arbitration program A_PRG when the above access to the RAIDs 10_1 to 10_4 is completed. Then, the arbitration program A_PRG of the input/output processing device 24_1 deletes the access request AR corresponding to the preview port P3 from the updated list of access permission order.

Next, in FIG. 10L, the arbitration program A_PRG executed by the input/output processing device 24_1 outputs an access permission notification ACN to the arbitrated program R_PRG of the input/output processing device among the devices 24_1 to 24_4 transmitting the access request AR linked with the reproduction port P1 having the next highest order based on the determined access permission order in response to the access request AR. Next, in FIG. 10M, the arbitrated program R_PRG receiving as input the access permission notification ACN in FIG. 10L accesses the RAIDs 10_1 to 10_4 via the data bus 12 to read out the content data, stores this in the reproduction buffer memory B1 shown in FIG. 2, and then outputs the same for broadcast etc. from the reproduction port P1 while guaranteeing the predetermined output rate. Next, in FIG. 10N, when the above access to the RAIDs 10_1 to 10_4 is completed, the arbitrated program R_PRG outputs the access completion notification FN to the arbitration program A_PRG. Then, the arbitration program A_PRG of the input/output processing device 24_1 deletes the access request AR corresponding to the reproduction port P1 from the list of access permission order.

Next, in FIG. 10O, the arbitration program A_PRG executed by the input/output processing device 24_1 outputs an access permission notification ACN to the arbitrated program R_PRG of the input/output processing device among the devices 24_1 to 24_4 transmitting the access request AR linked with the asynchronous port P4 having the next highest order based on the above determined access permission order in response to the access request AR. Next, in FIG. 10P, the arbitrated program R_PRG receiving as input the access permission notification ACN in FIG. 10O accesses the RAIDs 10_1 to 10_4 via the data bus 12 and performs asynchronous communication via the asynchronous port P4.

Fifth Example of Operation

In the above example of operation, input/output of data (including broadcasting etc.) between this system and the outside of the content broadcasting and editing system 1 via the input/output processing devices 24_1 to 24_4 was exemplified, but an operation of the edit terminals 30_1 and 30_2 connected to the network 32 accessing the RAIDs 10_1 to 10_4 along with the editing may be carried out parallel to the above example of operation as well. In this case, the relay server 22 shown in FIG. 1 is provided with the asynchronous port P4 shown in FIG. 2. This asynchronous port P4 is connected to the network 32. Further, the relay server 22 executes the above arbitrated program R_PRG. When the edit terminals 30_1 and 30_2 output the access requests to the relay server 22 via the network 32, the relay server 22 outputs an access request indicating the asynchronous port P4 to the arbitration program A_PRG executed by the input/output processing device 24_1. Due to this, the edit terminals 30_1 and 30_2 can access the RAID 10_1 to 10_4 and perform the editing without influencing the operation of the input/output processing devices 24_1 to 24_4 of the broadcast system 3 outputting the content data from the reproduction port P1 while guaranteeing the predetermined output rate.

As explained above, according to the broadcast system 3, the access permission order is set so as to give access permission with the highest priority to an access request linked with the reproduction port P1. Therefore, even when not assigning time slots having fixed time lengths to the ports at the constant period as in the conventional system, it becomes possible to guarantee the output rate of the output of the content data to the outside via the reproduction port P1. Further, according to the broadcast system 3, as explained above, the RAIDs 10_1 to 10_4 are accessed in response to an access permission notification input by an arbitrated program R_PRG executed by a processing circuit 56, and, when the access is completed, an access completion notification is output to the arbitration program A_PRG. Then, when the arbitration program A_PRG executed by the processing circuit 56 receives an execution completion notification, it gives the access right to the RAIDs 10_1 to 10_4 to the access request having the next highest order in the access permission order. For this reason, when the access times to the RAIDs 10_1 to 10_4 accompanying one access request are different, in comparison with the technique of using time slots prescribed in a fixed manner matching with the longest access time as in the conventional system shown in FIG. 11A, the access start timing to the RAIDs 10_1 to 10_4 along with each access request can be made earlier, the access response to the RAIDs 10_1 to 10_4 can be raised, and the RAIDs 10_1 to 10_4 can be efficiently utilized. Due to this, the performance of the broadcast system 3 can be improved.

The present invention is not limited to the above embodiments. In the above embodiments, the case where the input/output processing devices 24_1 to 24_4 and the RAIDs 10_1 to 10_4 were realized by different devices was exemplified, but the input/output processing devices 24_1 to 24_4 and the RAIDs 10_1 to 10_4 or all of the configuration of the broadcast system 3 may be built in one housing or chip as well. Further, in the above embodiments, the RAIDs 10_1 to 10_4 were illustrated as the storage means of the present invention, but storage devices other than RAIDs may be employed too. Further, any number of input/output processing devices 24_1 to 24_4 may be provided.

Summarizing the industrial applicability of the present invention, the present invention can be applied to a system arbitrating access requests to storage means from a plurality of processing means outputting data.

It should be understood by those skilled in the art that various modifications, combinations, sub-combinations and alterations may occur depending on design requirements and other factors insofar as they are within the scope of the appended claims or the equivalents thereof.

The invention claimed is:

1. A data processing system comprising:
   a storage means;
   a plurality of processing means, each for outputting an access request to access the storage means, for receiving a right of use to access the storage means, for accessing the storage means via a data transmission line and for outputting data read out from the storage means; and
   an arbitrating means, provided in one of the plurality of processing means, for arbitrating access to the storage means by the plurality of processing means via the data transmission line in response to the access requests received from the plurality of processing means, wherein
   the arbitrating means determines a right-of-use order for imparting the right of use of the data transmission line to the plurality of access requests input from the plurality of processing means according to a priority order previously determined for the type of the access requests and sequentially imparts the right of use to the plurality of access requests according to the determined right-of-use order, and
   each processing means accesses the storage means via the data transmission line conditional only on receiving the right of use from the arbitrating means, wherein access time to the storage means is based upon amount of time needed for access and is not based on a fixed length time slot.

2. A data processing system as set forth in claim 1, wherein each said processing means performs first external output processing for outputting content data read from said storage means to outside of the data processing system while guaranteeing a predetermined output rate and second external output processing for outputting the content data to the outside without guaranteeing the output rate, and
   said arbitrating means performs processing for determining said right-of-use order so as to impart said right of use to an access request linked with said first external output processing before an access request linked with said second external output processing.

3. A data processing system as set forth in claim 2, wherein in said first external output processing, each said processing means monitors the state of storage of a buffer memory temporarily storing content data read out from said storage means, outputs an access request to said arbitrating means conditional on the amount of stored data of said buffer memory being less than a predetermined threshold value, and outputs said content data read out from said buffer memory to the outside while guaranteeing a predetermined output rate.

4. A data processing system as set forth in claim 1, wherein each said processing means performs write processing for writing content data input from outside said data processing system to said storage means and external output processing for outputting the content data to the outside without guaranteeing the output rate, and
   said arbitrating means determines said right-of-use order so as to impart said right of use to an access request linked with said write processing before an access request linked with said external output processing.

5. A data processing system as set forth in claim 4, wherein in said write processing, each said processing means monitors the state of storage of a buffer memory temporarily storing content data input from the outside, outputs an access request to said arbitrating means conditional on the amount of stored data of said buffer memory becoming more than a predetermined threshold value, and writes said content data read out from said buffer memory to said storage means through said data transmission line when receiving said right of use.

6. A data processing system as set forth in claim 1, wherein each said processing means accesses said storage means through said data transmission line conditional on receiving said right of use from said arbitrating means and notifies the completion of access to said arbitrating means after the completion of said access, and
   said arbitrating means performs processing for giving said right of use to the next access request based on the result of the arbitration when receiving a notification of completion of access from said processing means.

7. A data processing system as set forth in claim 1, wherein said arbitrating means updates the right-of-use order in accordance with said priority order when a new access request is input after determining said right-of-use order.

8. A data processing system comprising:
   a storage means;
   a plurality of processing means for accessing the storage means via a data transmission line and outputting data read out from the storage means; and
   an arbitrating means for arbitrating access to the storage means by the plurality of processing means via the data transmission line in response to access requests from the plurality of processing means, wherein
   the arbitrating means determines a right-of-use order for imparting a right of use of the data transmission line to the plurality of access requests input from the plurality of processing means according to a priority order previously determined for the type of the access requests and sequentially imparts the right of use to the plurality of access requests according to the determined right-of-use order, and each processing means accesses the storage means via the data transmission line conditional only on receiving the right of use from the arbitrating means, wherein access time to the storage means is based upon amount of time needed for access and is not based on a fixed length time slot, wherein each said processing means is provided with a plurality of types of ports to which data input/output applications are assigned and outputs access requests designating the types of said ports to said arbitrating means, and said arbitrating means determines said right-of-use order in accordance with a priority order preset for the plurality of types of ports.

9. An access control method of a system for controlling access to a storage means by a plurality of processing means via a data transmission line, comprising:

a first step of having the plurality of processing means output access requests to an arbitrating means provided in one of the plurality of processing means;

a second step of having the arbitrating means determine a right-of-use order for imparting a right of use of the data transmission line to the plurality of access requests according to the priority order previously determined for the type of the access request;

a third step of sequentially imparting the right of use to the plurality of access requests according to the determined right-of-use order and the plurality of processing means receiving the right of use; and a fourth step of having a processing means access the storage means via the data transmission line conditional only on the processing means receiving the right of use for the access request output by that processing means, wherein access time to the storage means is based upon amount of time needed for access and is not based on a fixed length time slot.

10. An access control method as set forth in claim 9, further comprising in said second step having said arbitrating means perform processing to determine said right-of-use order so as to impart said right of use to an access request linked with first external output processing for outputting content data read from said storage means to outside of the system while guaranteeing a predetermined output rate before an access request input linked with second external output processing for outputting the content data to the outside without guaranteeing the output rate.

11. An access control method as set forth in claim 9, further comprising in said second step having said arbitrating means perform processing to determine said right-of-use order so as to impart said right of use to an access request linked with write processing for writing content data input from outside of the system before an access request linked with external output processing for outputting the content data to the outside without guaranteeing the output rate.

12. An access control method as set forth in claim 9, further comprising a fifth step of having each said processing means notify the completion of access to said arbitrating means after the completion of the fourth step of accessing said storage means through said data transmission line and said second step further comprises having said arbitrating means perform processing for imparting said right of use to the next access request based on the result of arbitration when receiving a notification of completion of access from said processing means.

13. An access control method as set forth in claim 9, further comprising, in said second step, having said arbitrating means update the right-of-use order in accordance with said priority order when a new access request is input after determining said right-of-use order.

14. An access control device of a system for controlling access to a storage means by a plurality of processing means via a data transmission line, comprising:

an interface for receiving as input access requests from the plurality of processing means, the interface provide in one of the plurality of processing means;

a determining means for determining a right-of-use order for imparting a right of use of the data transmission line to the plurality of access requests input from the interface according to a priority order previously determined with respect to the type of the access request; and a right-of-use imparting means for sequentially imparting the right of use to the plurality of access requests according to the right-of-use order determined by the determining means and the plurality of processing means receiving the right to use, wherein access time of the storage means is based upon amount of time needed for access and is not based on a fixed length time slot.

15. An access control device as set forth in claim 14, wherein said determining means determines said right-of-use order so as to impart said right of use to an access request linked with first external output processing for outputting content data read from said storage means to outside of the system while guaranteeing a predetermined output rate before an access request input linked with second external output processing for outputting the content data to the outside without guaranteeing the output rate.

16. An access control device as set forth in claim 14, wherein said determining means determines said right-of-use order so as to impart said right of use to an access request linked with write processing for writing content data input from outside of the system before an access request linked with external output processing for outputting the content data to the outside without guaranteeing the output rate.

17. An access control device as set forth in claim 14, wherein each said processing means accesses said storage means through said data transmission line conditional on receiving said right of use from said right-of-use imparting means and notifies the completion of access to said interface after the completion of said access, and said determining means performs processing for determining the next access request based on the priority order when receiving a notification of completion of access from said interface.

18. An access control device as set forth in claim 14, wherein said determining means updates the right-of-use order in accordance with said priority order when a new access request is input from said interface after determining said right-of-use order.

* * * * *